US011081090B2

(12) United States Patent
Heo et al.

(10) Patent No.: US 11,081,090 B2
(45) Date of Patent: Aug. 3, 2021

(54) METHOD FOR DISPLAYING OBJECTS AND ELECTRONIC DEVICE USING THE SAME

(71) Applicant: Samsung Electronics Co., Ltd., Suwon-si (KR)

(72) Inventors: Jiyoon Heo, Suwon-si (KR); Hayoung Jeon, Suwon-si (KR); Minjung Moon, Suwon-si (KR); Minjeong Moon, Suwon-si (KR); Myojin Bang, Suwon-si (KR); Seoyoung Yoon, Suwon-si (KR); Jaegi Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/544,199

(22) Filed: Aug. 19, 2019

(65) Prior Publication Data

US 2020/0126519 A1    Apr. 23, 2020

(30) Foreign Application Priority Data

Oct. 23, 2018 (KR) .................. 10-2018-0126644

(51) Int. Cl.
*G09G 5/38* (2006.01)
*G09G 5/373* (2006.01)
(Continued)

(52) U.S. Cl.
CPC ............. *G09G 5/38* (2013.01); *G06F 1/1652* (2013.01); *G06F 3/0488* (2013.01);
(Continued)

(58) Field of Classification Search
None
See application file for complete search history.

(56) References Cited

U.S. PATENT DOCUMENTS

| 10,209,878 B2 | 2/2019 | Sang et al. |
| 2012/0032979 A1 | 2/2012 | Blow et al. |

(Continued)

FOREIGN PATENT DOCUMENTS

| EP | 3 065 025 A1 | 9/2016 |
| JP | 2006-243621 A | 9/2006 |

(Continued)

OTHER PUBLICATIONS

International Search Report dated Nov. 29, 2019, issued in International Application No. PCT/KR2019/010470.

*Primary Examiner* — Jwalant Amin
(74) *Attorney, Agent, or Firm* — Jefferson IP Law, LLP

(57) ABSTRACT

An electronic device is provided. The electronic device includes a foldable housing configured to include a first housing member having a first surface and a second surface facing away from the first surface, a second housing member having a first surface facing the first surface of the first housing member when folded in a first direction and a second surface facing the second surface of the first housing member when folded in a second direction, and a connection mechanism connecting the first housing member and the second housing member, a flexible display exposed through the first surface of the first housing member and the first surface of the second housing member, a processor electrically connected to the flexible display, and a memory electrically connected to the processor, wherein the memory may store instructions that, when executed, cause the processor to designate a physically deformed specific region of the flexible display, determine whether at least one selectable object is located in the specific region, and reconfigure the at least one selectable object.

20 Claims, 14 Drawing Sheets

(51) Int. Cl.
  *G06F 3/0484* (2013.01)
  *G06F 1/16* (2006.01)
  *G06F 3/0488* (2013.01)

(52) U.S. Cl.
  CPC ......... *G06F 3/04842* (2013.01); *G09G 5/373* (2013.01); *G09G 2354/00* (2013.01); *G09G 2380/02* (2013.01)

(56) References Cited

U.S. PATENT DOCUMENTS

| | | | |
|---|---|---|---|
| 2012/0235894 A1* | 9/2012 | Phillips | G09G 3/36 345/156 |
| 2013/0215041 A1* | 8/2013 | Kim | G06F 3/0346 345/173 |
| 2014/0015743 A1* | 1/2014 | Seo | G06F 1/3265 345/156 |
| 2015/0220119 A1* | 8/2015 | Seo | G06F 3/03 345/173 |
| 2016/0085319 A1 | 3/2016 | Kim et al. | |
| 2016/0259514 A1 | 9/2016 | Sang et al. | |
| 2017/0003825 A1 | 1/2017 | Kwak et al. | |
| 2017/0102738 A1* | 4/2017 | Park | G06F 3/04842 |
| 2017/0185289 A1 | 6/2017 | Kim et al. | |
| 2018/0018753 A1 | 1/2018 | McLaughlin | |
| 2018/0082632 A1* | 3/2018 | Lee | G09G 3/3225 |

FOREIGN PATENT DOCUMENTS

| | | |
|---|---|---|
| KR | 10-2016-0031305 A | 3/2016 |
| KR | 10-2017-0077434 A | 7/2017 |
| WO | 2016/039498 A1 | 3/2016 |

\* cited by examiner

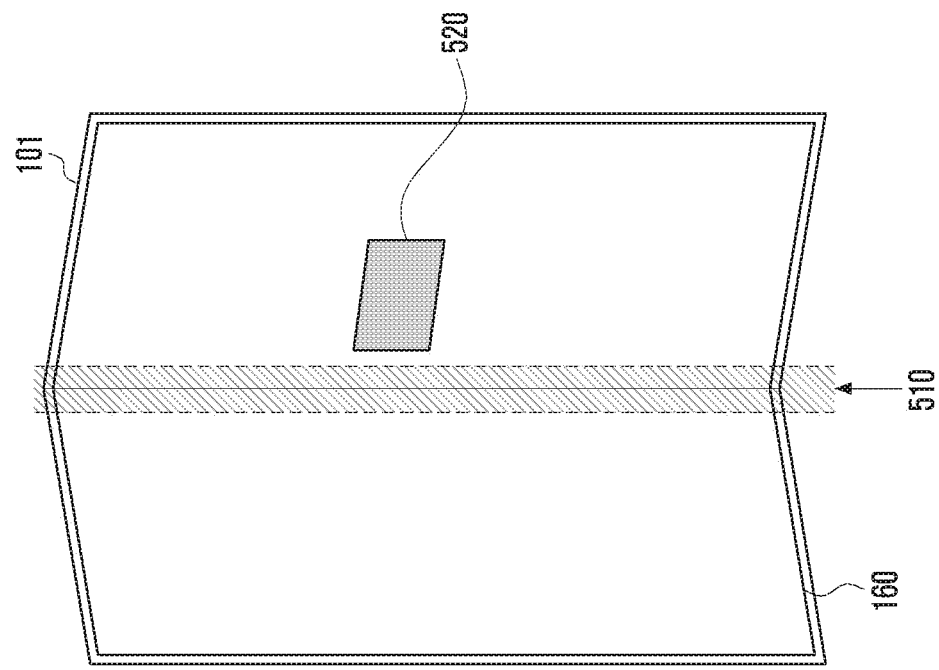
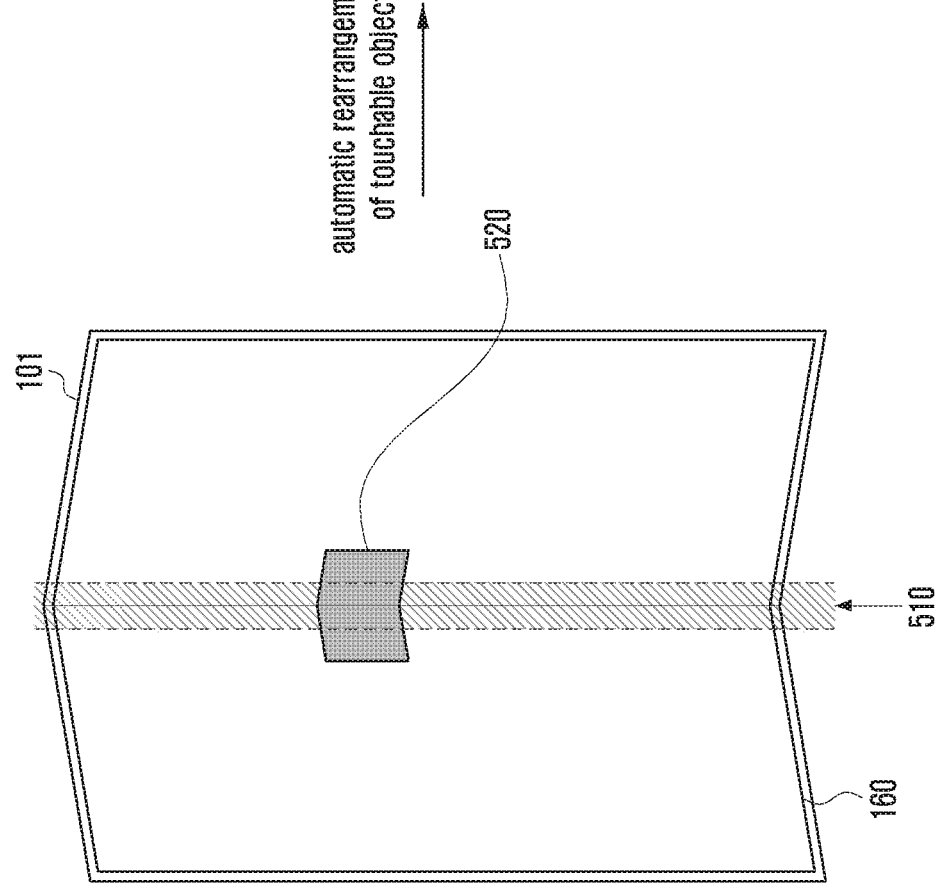
FIG. 5

METHOD FOR DISPLAYING OBJECTS AND ELECTRONIC DEVICE USING THE SAME

CROSS-REFERENCE TO RELATED APPLICATION(S)

This application is based on and claims priority under 35 U.S.C. § 119(a) of a Korean patent application number 10-2018-0126644, filed on Oct. 23, 2018, in the Korean Intellectual Property Office, the disclosure of which is incorporated by reference herein in its entirety.

BACKGROUND

1. Field

The disclosure relates to a method of displaying objects for an electronic device having a flexible display.

2. Description of Related Art

An electronic device may have a flexible display whose at least a portion is foldable to display one or more objects. The user can control the folding and unfolding of the display by applying a force or pressure to the exterior of the electronic device.

Such an electronic device may be folded or unfolded by an external force or pressure exerted by the user. When the electronic device is folded, the touch gesture of the user may be inapplicable or inaccurate in the folding region. For example, when a user-manipulatable object is located in the folding region, it may be difficult for the user to touch the desired point to select the object if the degree of folding is significant (e.g. reduction of the angle between the parts of the display relative to the folding region).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of displaying objects for an electronic device having a flexible display that can reduce the user's inconvenience due to the physical deformation of the flexible display.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing including a first housing member having a first surface and a second surface facing away from the first surface, a second housing member having a first surface facing the first surface of the first housing member when folded in a first direction and a second surface facing the second surface of the first housing member when folded in a second direction, and a connection mechanism connecting the first housing member and the second housing member, a flexible display exposed through the first surface of the first housing member and the first surface of the second housing member, a processor electrically connected to the flexible display, and a memory electrically connected to the processor. The memory may store instructions that, when executed, cause the processor to designate a specific region of the flexible display, the specific region being physically deformed, determine whether at least one selectable object is located in the specific region, and reconfigure the at least one selectable object.

In accordance with another aspect of the disclosure, an electronic device is provided. The electronic device includes a foldable display, a processor electrically connected to the foldable display, and a memory electrically connected to the processor. The memory may store instructions that, when executed, cause the processor to designate a specific region of the foldable display, the specific region being physically deformed, determine whether at least one selectable object is located in the specific region, and reconfigure the at least one selectable object.

According to an embodiment of the disclosure, the electronic device having a flexible display may check a physical deformation of the flexible display and relocate, if a user-manipulable object is located in the physically deformed region, the object to the remaining display area except for the physically deformed region. If it is difficult to select a displayed object owing to folding, bending, or rolling of the flexible display, the electronic device may move or reconfigure the object on the display so that the user can easily manipulate the object. Hence, it is possible to reduce the inconvenience of the user due to the physical deformation of the flexible display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 depicts a process of relocating an object displayed in the folding region in response to folding according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
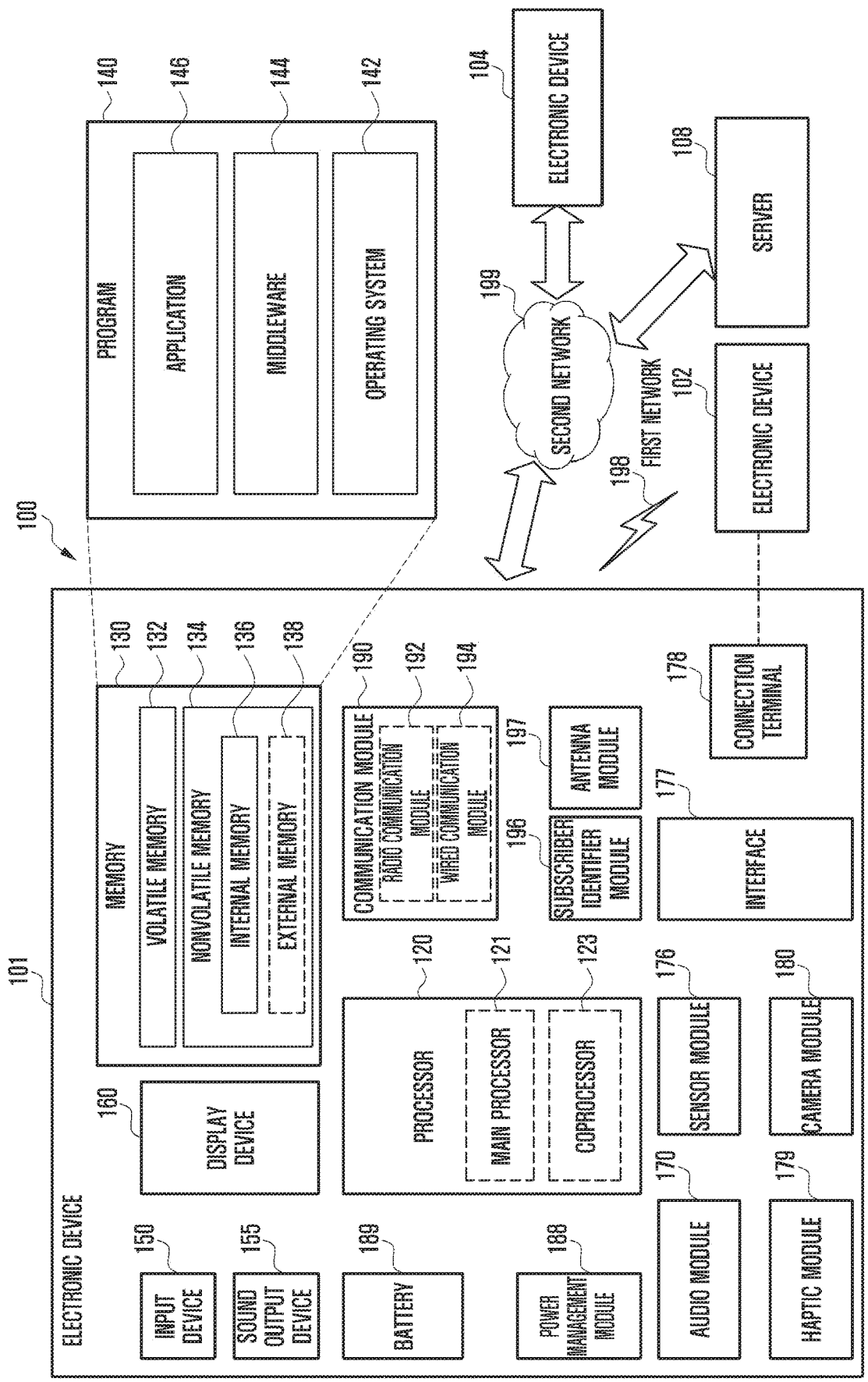
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of, the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
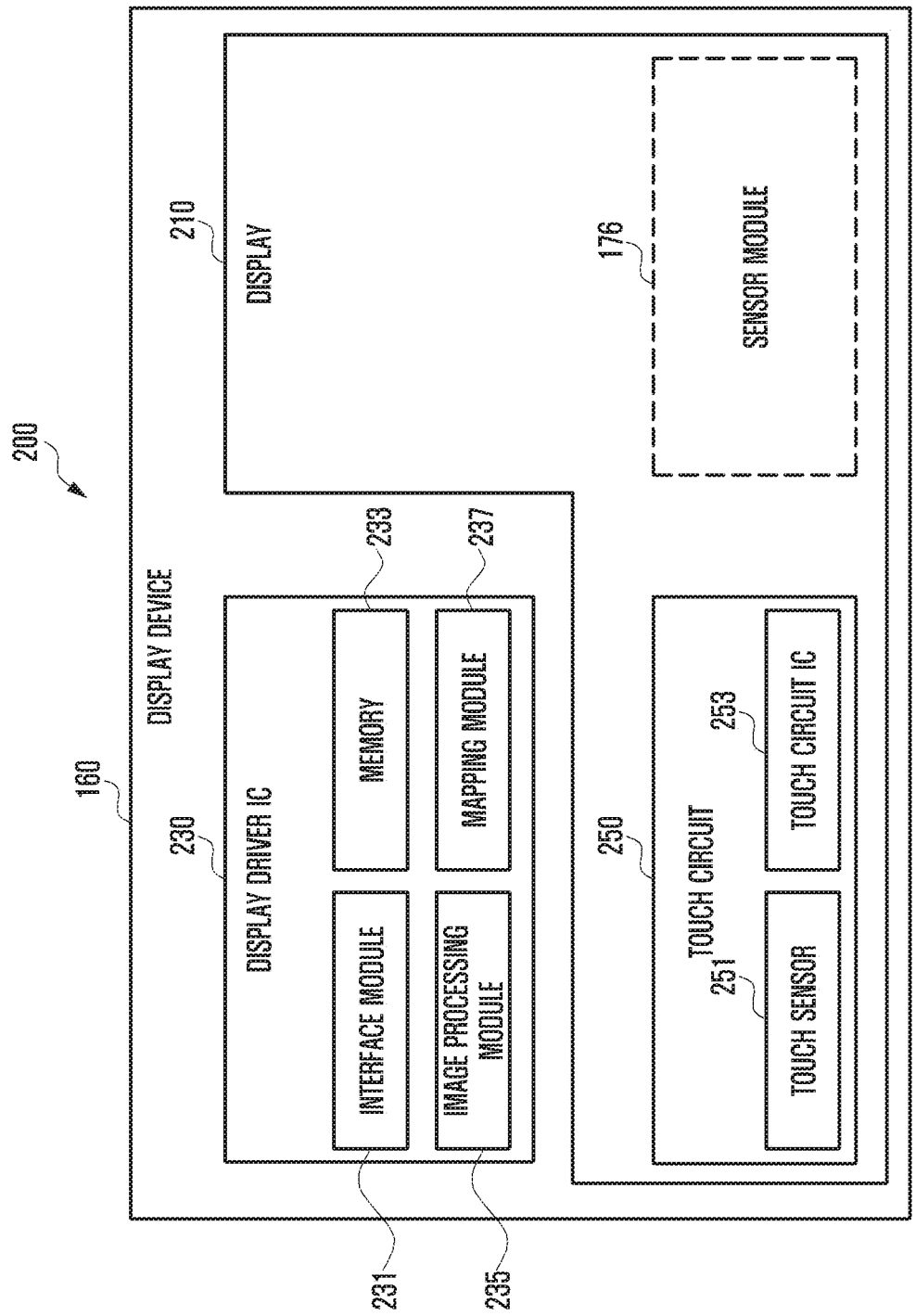
FIG. 2 is a block diagram of a display according to an embodiment of the disclosure.

FIG. 2 is a block diagram 200 illustrating the display device 160 according to an embodiment of the disclosure.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. The pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. The generating of the voltage value or current value may be performed, for example, based at least in part on one or more attributes of the pixels (e.g., an array, such as a red, green, and blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

The display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. At least part (e.g., the touch sensor IC 253) of the touch circuitry 250 may be formed as part of the display 210 or the DDI 230, or as part of another component (e.g., the auxiliary processor 123) disposed outside the display device 160.

The display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. The touch sensor 251 or the sensor module 176 may be disposed between pixels in a pixel layer of the display 210, or over or under the pixel layer.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 3:
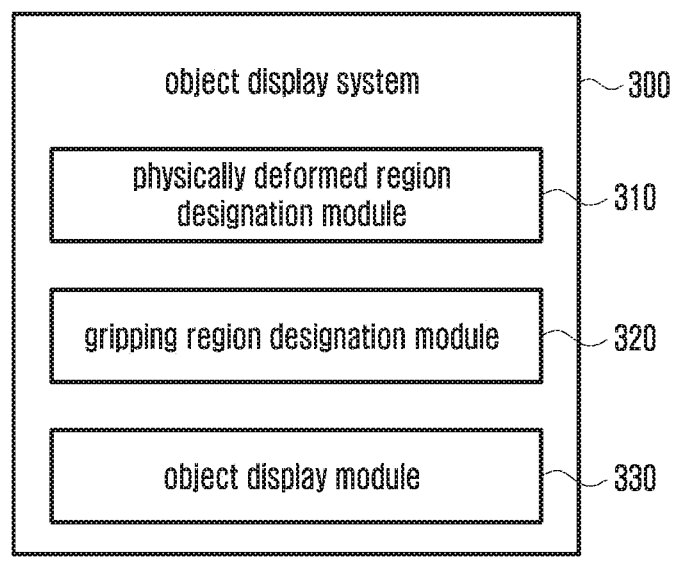
FIG. 3 is a schematic diagram of an object display system according to an embodiment of the disclosure.

FIG. 3 is a schematic diagram of an object display system according to an embodiment of the disclosure.

Referring to FIG. 3, in various embodiments, the electronic device 101 may identify the physical deformation of the flexible display through the object display system 300 and move the object displayed in the physically deformed region to the remaining display area except for the physically deformed region. The electronic device 101 may also reconfigure the size and layout of at least one object displayed in the physically deformed region. For example, the object display system 300 may include a physically deformed region designation module 310, a gripping region designation module 320, and an object display module 330.

The term "flexible display" may indicate a display that can be physically deformed by an external force and can normally perform the display operation of the electronic device 101. The flexible display may be referred to as a foldable display, a bendable display, or a rollable display. Accordingly, the user of the electronic device 101 may fold, bend, or roll the flexible display. In the following description, the terms "folding", "bending", and "rolling" of the electronic device 101 may be interchangeably used.

The physically deformed region designation module 310 may sense a physical deformation due to the bending or folding of the display of the electronic device 101. When the electronic device 101 senses a physical deformation caused by an applied external force, it can create or designate a corresponding physically deformed region.

The physically deformed region may refer to a region of the display that is difficult for the user to physically contact because the degree of bending, folding, or rolling of the display is severe. Or, the physically deformed region may be a region where touch recognition at a position intended by the user is substantially impossible or not smooth even if physical contact is possible. For example, when the angle formed by the bending of the display is less than a threshold angle, it is not easy to select the target object with a finger or an external accessory, so the corresponding region can be determined as the physically deformed region.

The physically deformed region may be a region including the folding line that is generated along the folding of the display. The physically deformed region may include a region spaced a given distance from the folding line.

The given distance from the folding line can be adjusted according to the folding angle of the display. The electronic device 101 may store the relationship between the separation distance (e.g., from the folding line) and the angle as a mapping table, and may utilize the mapping table to determine the physically deformed region as needed. For example, if the angle between the two parts of the display relative to the folding line is small, as the user will have difficulty in entering touch input, the separation distance may increase. As the angle between the two parts of the display becomes smaller, the physically deformed region can become larger.

The gripping region designation module 320 may designate a region where a user's body part (e.g., finger, hand, or palm) is in contact with the display as a gripping region. For example, when the gripping region is in the display, it may be difficult for the user to touch the gripping region even with another hand. As another example, because the gripping region is already being touched by the user's finger, the user cannot immediately identify which object is located in the gripping region (e.g., what type of menu can be selected, or which keypad is located).

The gripping region designation module 320 can designate a portion of the region where the user's body part is in contact with the display overlapping a region where an object is displayed as a gripping region. The gripping region designation module 320 may designate only the region overlapping with an object displayed on the display as a gripping region. Alternatively, the gripping region designation module 320 may designate the gripping region to include both a region overlapping with a displayed object and a region spaced a given distance from the overlapping region. In this case also, the region spaced a given distance from the overlapping region may indicate a region within the object displayed on the display. The gripping region may indicate a specific portion in an object displayed on the display.

The object display module 330 can check whether an object is located on the physically deformed region designated by the physically deformed region designation module 310, and can control the display of the object located on the physically deformed region.

The object may be an interface element that can receive user input (e.g., keyboard, gallery, memo, or video player).

The object display module 330 can move an object located on the physically deformed region to the remaining display area other than the physically deformed region and display the object at the new location.

The object display module 330 may adjust at least one of the size or the layout of an object displayed on the physically deformed region.

The object display module 330 can check whether an object is located on the gripping region designated by the gripping region designation module 320, and may control the display of the object located on the gripping region.

The object display module 330 can move an object located on the gripping region to the remaining display area except for the gripping region and display the object at the new location.

The object display module 330 may adjust at least one of the size or the layout of an object displayed on the gripping region.

Figure 4:
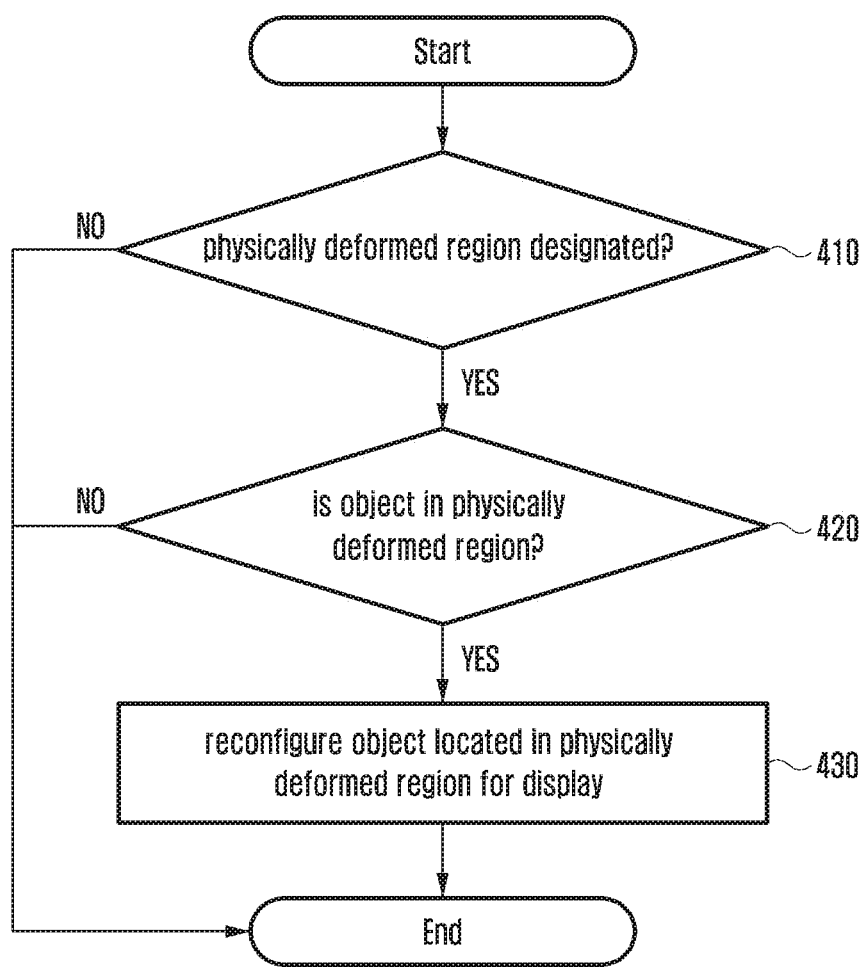
FIG. 4 is a flowchart of a method for the electronic device to rearrange an object in the display area excluding the physically deformed region according to an embodiment of the disclosure.

FIG. 4 is a flowchart of a method for the electronic device to display a reconfigured object in the display area excluding the physically deformed region according to an embodiment of the disclosure.

Referring to FIG. 4, at operation 410, the electronic device 101 may sense a physical deformation. Upon sensing a physical deformation caused by an applied external force, the electronic device 101 may create or designate a corresponding physically deformed region. For example, the physically deformed region may refer to a region of the display where it is difficult for the user to physically contact because the degree of bending, folding, or rolling of the display is severe. Or, the physically deformed region may be a region where touch recognition at a position intended by the user is substantially impossible or not smooth even if physical contact is possible.

If a physically deformed region is designated, then at operation 420, the electronic device 101 can check whether at least one object is located in the physically deformed region. For example, the object may be an interface element that can receive user input (e.g., keyboard, gallery, memo, or video player).

If at least one object is located in the physically deformed region, at operation 430, then the electronic device 101 may reconfigure the object located in the physically deformed region and display the reconfigured object. Specific embodiments of this are described with reference to FIGS. 5 to 14.

FIG. 5 depicts a process of relocating an object displayed in the folding region in response to folding according to an embodiment of the disclosure.

Referring to FIG. 5, the electronic device 101 may include a display unit 160. For example, the display of the display unit 160 may be bended or folded by a physical force or pressure.

The display of the electronic device 101 may be folded due to an external force or pressure, and a folding region 510 may be generated according to the folding. For example, the folding region 510 may correspond to the physically deformed region.

The electronic device 101 can check whether an object 520 that can receive a user touch input is located on the folding region 510. If a touch-enabled object 520 is located on the folding region 510, the electronic device 101 can move the touch-enabled object 520 to display the touch-enabled object 520 in the remaining display area other than the folding region 510.

The electronic device 101 may analyze the direction of the force applied by the user and move the object corresponding to the direction of the force. For example, when the user folds the left side portion of the electronic device 101 with the left hand while holding the right side portion of the electronic device 101 with the right hand, the electronic device 101 may move the object 520 located in the folding region 510 to display the object 520 on the right side of the display with respect to the folding region 510. As another example, when the user folds the right side portion of the electronic device 101 with the right hand while holding the left side portion of the electronic device 101 with the left hand, the electronic device 101 may move the object 520 located in the folding region 510 to display the object 520 on the left side of the display with respect to the folding region 510.

Figure 6:
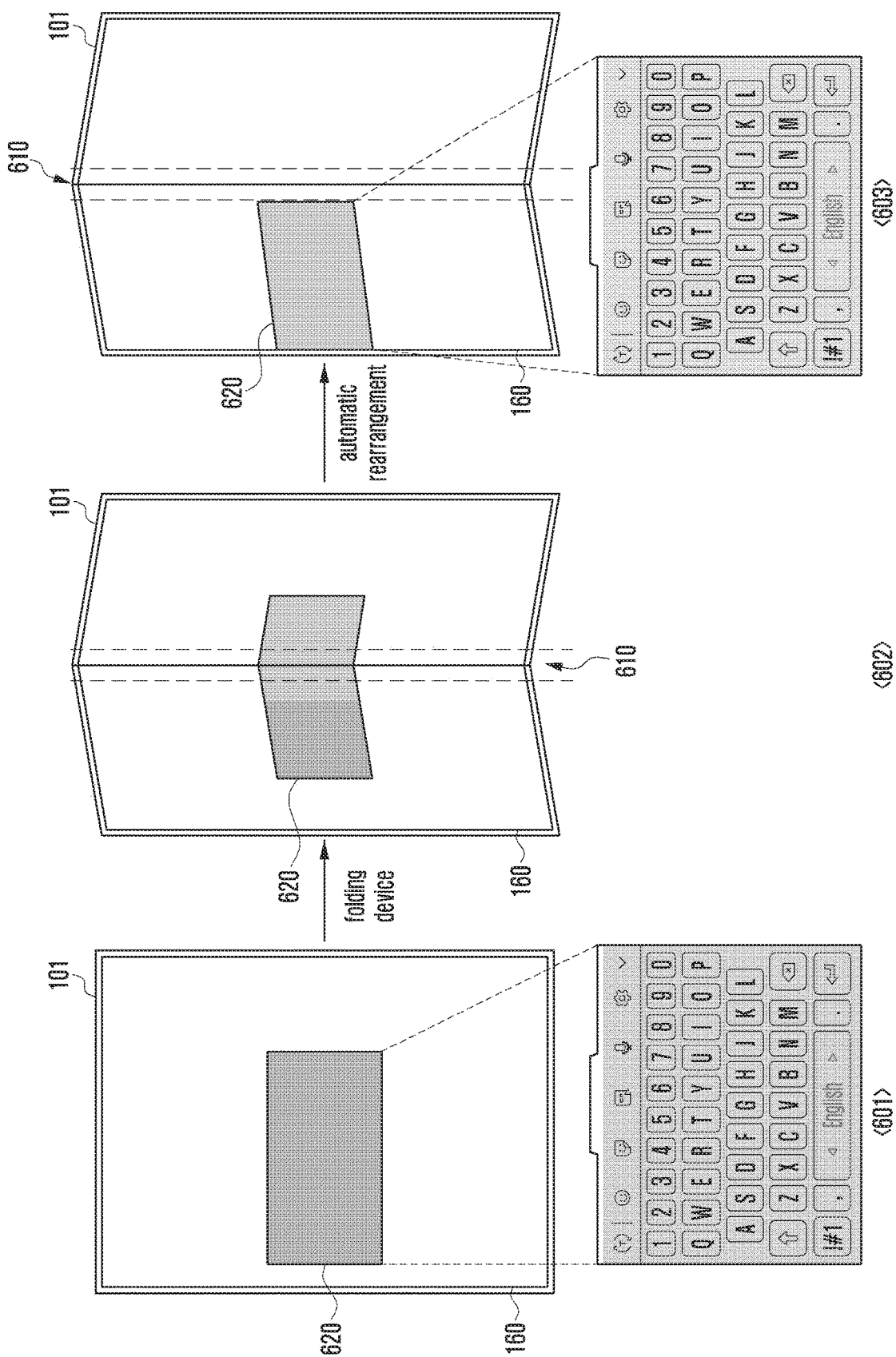
FIG. 6 depicts a first method of relocating an object displayed in the folding region with a change in position and size in response to folding according to an embodiment of the disclosure.

FIG. 6 depicts a first method of relocating an object displayed in the folding region with a change in position and size in response to folding according to an embodiment of the disclosure.

Referring to FIG. 6, in various embodiments, the electronic device 101 may include a display unit 160. For example, the display of the display unit 160 may be bended or folded by a physical force or pressure.

As indicated by indicia 601, an object 620 may be displayed on the display of the electronic device 101. For example, the object 620 may be an input interface element (e.g., soft input panel such as a keyboard or a keypad).

As indicated by indicia 602, the display of the electronic device 101 may be folded due to an external force or pressure, and a folding region 610 may be generated according to the folding. For example, the folding region 610 may correspond to the physically deformed region.

As indicated by indicia 603, because the touch-enabled object 620 is located on the folding region 610, the electronic device 101 can move the touch-enabled object 620 to display the touch-enabled object 620 in the remaining display area other than the folding region 610.

The electronic device 101 can identify the direction in which the displayed object 620 is biased with respect to the folding line. For example, if the size of the left side portion of the object 620 is greater than the size of the right side portion thereof with respect to the folding line, the electronic device 101 can move the object 620 to the left side. If the length of the left side portion of the display is less than the length of the object 620, the electronic device 101 can automatically reduce the size of the object 620 to display the object 620. As another example, if the size of the right side portion of the object 620 is greater than the size of the left side portion thereof with respect to the folding line, the electronic device 101 can move the object 620 to the right side. If the length of the right side portion of the display is less than the length of the object 620, the electronic device 101 can automatically reduce the size of the object 620 to display the object 620.

Figure 7:
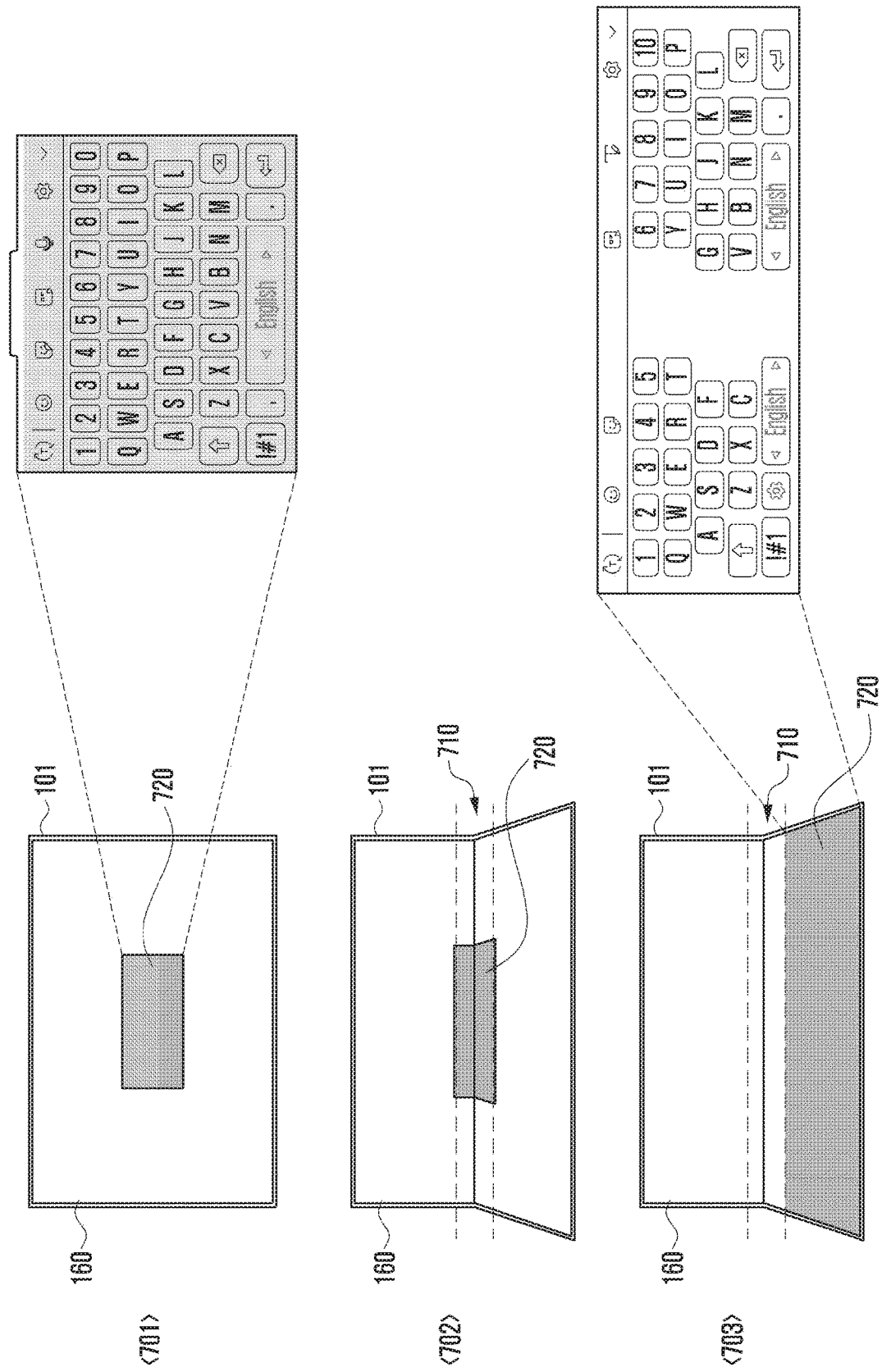
FIG. 7 depicts a second method of relocating an object displayed in the folding region with a change in position and size in response to folding according to an embodiment of the disclosure.

FIG. 7 depicts a second method of relocating an object displayed in the folding region with a change in position and size in response to folding according to an embodiment of the disclosure.

Referring to FIG. 7, the electronic device 101 may include a display unit 160. For example, the display of the display unit 160 may be bended or folded by a physical force or pressure.

As indicated by indicia 701, an object 720 may be displayed on the display of the electronic device 101. For example, the object 720 may be an input interface element (e.g., soft input panel such as a keyboard or a keypad). The electronic device 101 may be in the landscape (horizontal) mode as a result of rotating 90 degrees from the portrait (vertical) mode.

As indicated by indicia 702, the display of the electronic device 101 may be folded due to an external force or pressure, and a folding region 710 may be generated according to the folding. For example, the folding region 710 may correspond to the physically deformed region.

As indicated by indicia 703, because the touch-enabled object 720 is located on the folding region 710, the electronic device 101 can move the touch-enabled object 720 to display the touch-enabled object 720 in the remaining display area other than the folding region 710.

The electronic device 101 in the landscape mode may move the object 720 to display the object 720 in the display area having a larger contact area with the horizontal plane (e.g., floor, desk, or user's lap) among the two display areas divided along the folding line. For example, as indicated by indicia 703, when the user lifts the upper display area relative to the folding region 710, the electronic device 101 may display the object 720 in the lower display area having a wider contact area. In this case, like a laptop personal computer (PC), the object 720 may be displayed in a portion or the whole of the lower display area. For example, if the object 720 acts as an input interface, the electronic device 101 can rearrange the keys disposed on the keyboard and control the object to fill the whole of the lower display area.

When the number of keys arranged on the keyboard is limited while the lower display area is wide, the electronic device 101 may provide a split keyboard substantially in the whole of the lower display area. In this case, only the split keyboard may be displayed in the lower display area, and no other objects can be displayed in a region where no keys are arranged.

When the number of keys arranged on the keyboard is limited while the lower display area is wide, the electronic device 101 may provide a split keyboard in a region of the lower display area. In this case, the lower display area can be divided into at least three regions, and the split keyboard may be displayed in the left and right regions of the lower display area. In the middle region, an object other than the keyboard (e.g., document, memo, gallery, or video player) may be displayed.

Figure 8:
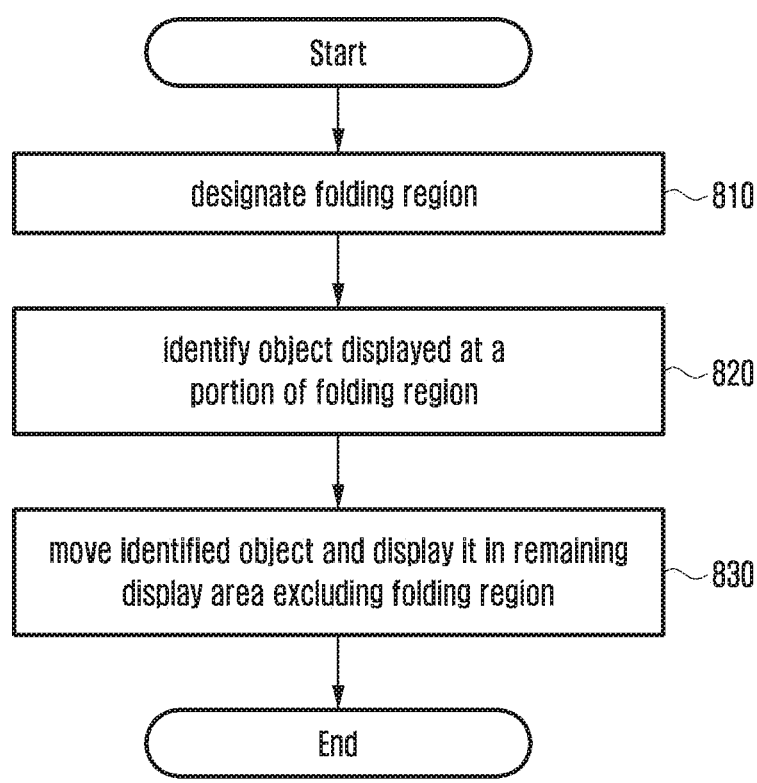
FIG. 8 is a flowchart of a method for the electronic device to relocate an object to the display area excluding the folding region according to an embodiment of the disclosure.

FIG. 8 is a flowchart of a method for the electronic device to relocate an object to the display area excluding the folding region according to an embodiment of the disclosure.

Referring to FIG. 8, at operation 810, the electronic device 101 may sense the folding of the display. Upon sensing the folding of the display caused by an applied external force, the electronic device 101 may designate a corresponding folding region. For example, the folding region may refer to a region of the display where it is difficult for the user to physically contact because the degree of folding of the display is severe. Or, the folding region may be a region where touch recognition at a position intended by the user is substantially impossible or not smooth even if physical contact is possible. The term "folding region" may be used interchangeably with the term "bending region" as described above with reference to FIG. 3.

At operation 820, the electronic device 101 may identify an object displayed at at least a portion of the designated folding region. For example, the object may be an interface element that can receive user input (e.g., keyboard, gallery, memo, or video player).

At operation 830, the electronic device 101 can move the identified object to display it in the remaining display area other than the folding region.

Figure 9:
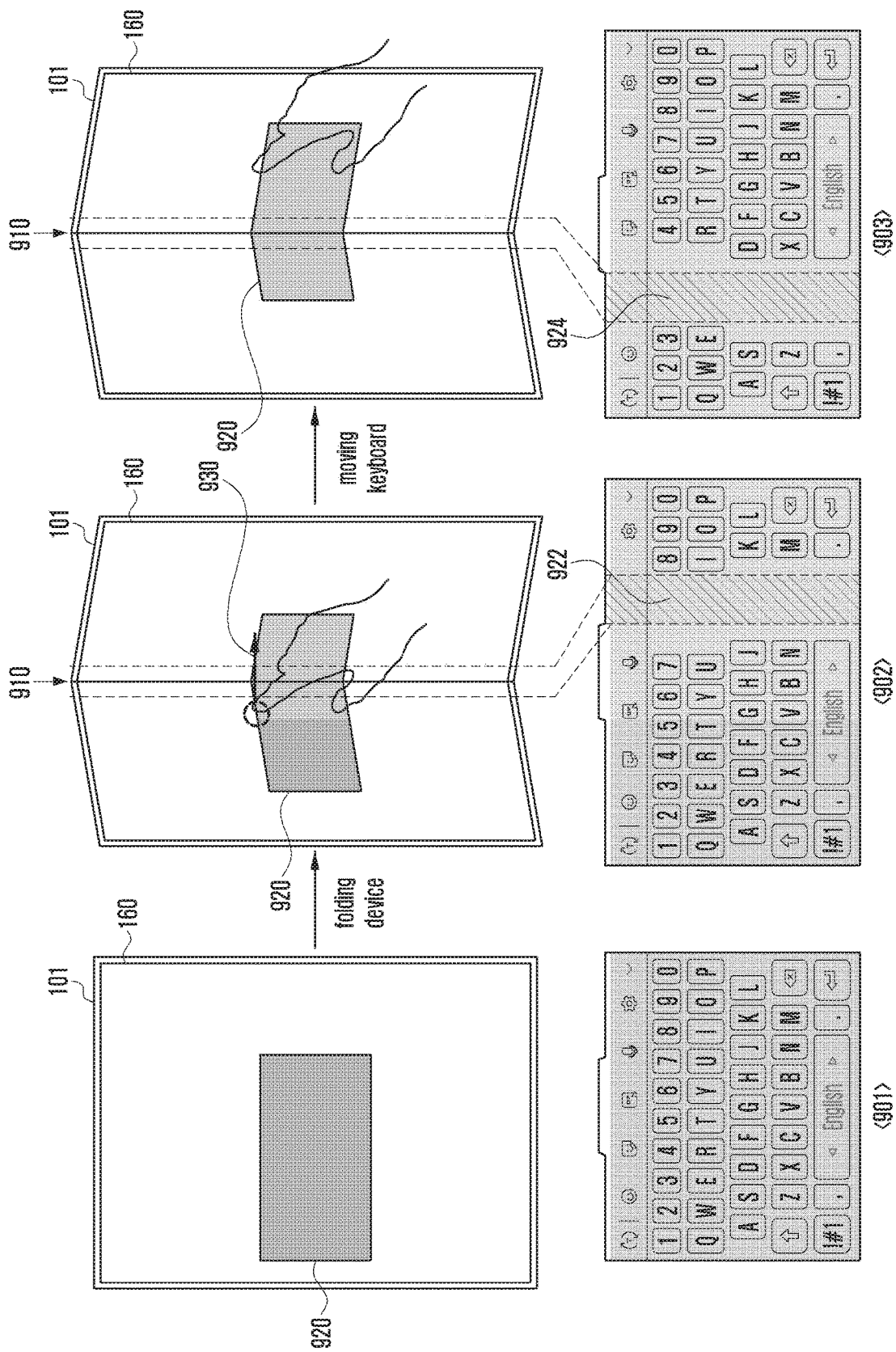
FIG. 9 depicts a process of reconfiguring a portion of the object displayed in the folding region in response to folding according to an embodiment of the disclosure.

FIG. 9 depicts a process of reconfiguring a portion of the object displayed in the folding region in response to folding according to an embodiment of the disclosure.

Referring to FIG. 9, the electronic device 101 may include a display unit 160. For example, the display of the display unit 160 may be bended or folded by a physical force or pressure.

As indicated by indicia 901, an object 920 may be displayed on the display of the electronic device 101. For example, the object 920 may be an input interface element (e.g., soft input panel such as a keyboard or a keypad).

As indicated by indicia 902, the display of the electronic device 101 may be folded due to an external force or pressure, and a folding region 910 may be generated according to the folding. For example, the folding region 910 may correspond to the physically deformed region.

As indicated by indicia 902, the electronic device 101 can reconfigure the object 920 located on the folding region 910. If the object 920 includes a plurality of input keys that can be touched by the user, the electronic device 101 may change the arrangement of one or more input keys located in the folding region 910 among the plural input keys. For example, the electronic device 101 may stretch the object 920 to the left and right and configure the object 920 to include a shaded portion 922. In addition, the plural input keys may be distributed in the remaining area of the object except for the shaded portion 922. Consequently, as the input keys to be touched are no longer arranged in the physically deformed region 910, the user of the electronic device 101 can enter a desired key or button more easily.

As indicated by indicia 902, the user of the electronic device 101 may apply a movement input 930 to the object 920. For example, the movement input 930 may correspond to a touch gesture such as drag-and-drop or swipe, or a voice command. In response to the movement input 930 to the object 920, the electronic device 101 may move the object 920 to display it at a location intended by the user.

As indicated by indicia 903, in response to the movement input 930 to the object 920, the electronic device 101 may reconfigure the object 920. If the object 920 includes a plurality of input keys that can be touched by the user, the electronic device 101 may change the arrangement of one or more input keys located in the folding region 910 among the plural input keys. For example, the electronic device 101 may stretch the object 920 to the left and right and configure the object 920 to include a shaded portion 924. In addition, the plural input keys may be distributed in the remaining area of the object except for the shaded portion 924. Consequently, as the input keys to be touched are no longer arranged in the physically deformed region 910, the user of the electronic device 101 can enter a desired key or button more easily.

As indicated by indicia 902 or 903, the electronic device 101 may adjust the position of the shaded portion 922 or 924 according to the folding region 910 and the location of the object 920 on the folding region 910. The shaded portion 922 or 924 is included in the object 920, but it cannot be manipulated by a touch gesture of the user.

Figure 10:
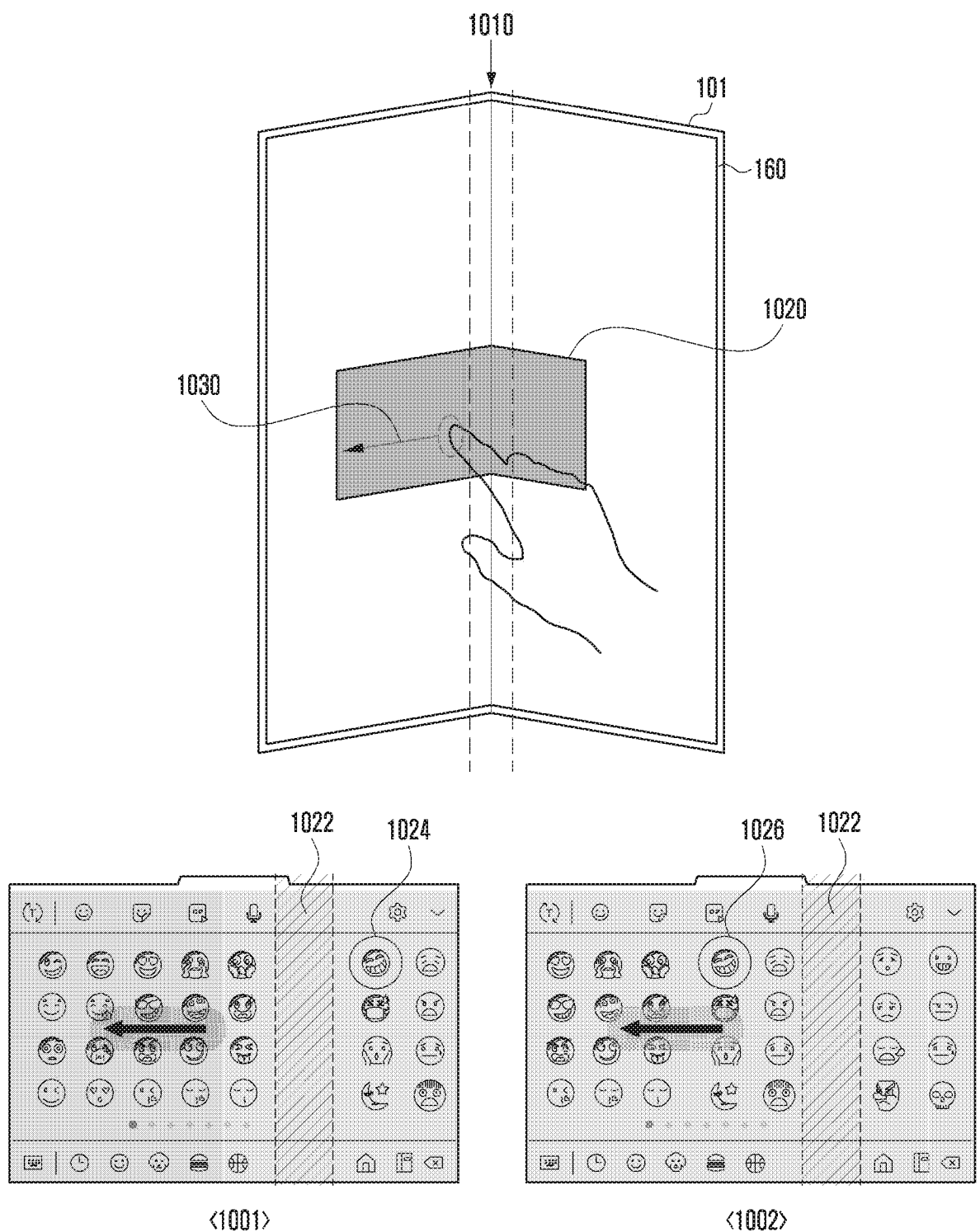
FIG. 10 depicts a process of reconfiguring a portion of a displayed object in response to a user input to the object when the display is folded according to an embodiment of the disclosure.

FIG. 10 depicts a process of reconfiguring a portion of a displayed object in response to a user input to the object when the display is folded according to an embodiment of the disclosure.

Referring to FIG. 10, the electronic device 101 may include a display unit 160. For example, the display of the display unit 160 may be bended or folded by a physical force or pressure.

An object 1020 may be displayed on the display of the electronic device 101. For example, the object 1020 may be an input interface element (e.g., soft input panel such as a keyboard or a keypad).

The display of the electronic device 101 may be folded due to an external force or pressure, and a folding region 1010 may be generated according to the folding. For example, the folding region 1010 may correspond to the physically deformed region.

As indicated by indicia 1001, the electronic device 101 can reconfigure the object 1020 located on the folding region 1010. If the object 1020 includes a plurality of input keys that can be touched by the user (e.g., letters, images, or emoticons), the electronic device 101 may change the arrangement of one or more input keys located in the folding region 1010 among the plural input keys. For example, the electronic device 101 may stretch the object 1020 to the left and right and configure the object 1020 to include a shaded portion 1022. In addition, the plural input keys may be distributed in the remaining area of the object except for the shaded portion 1022. Consequently, as the input keys to be touched are no longer arranged in the physically deformed region 1010, the user of the electronic device 101 can enter a desired key or button more easily.

As indicated by indicia 1002, the user of the electronic device 101 may apply a movement input 1030 to at least one input key of the object 1020. For example, the movement input 1030 may correspond to a touch gesture such as drag-and-drop or swipe, or a voice command. In response to the movement input 1030 to the at least one input key of the object 920, the electronic device 101 can move at least one key included in the object 1020 while maintaining the position of the object 1020. In this case, the shaded portion 1022 may remain intact, and at least one key may be moved to a different location by the user's movement input 1030 (e.g., movement from location 1024 to location 1026).

Figure 11:
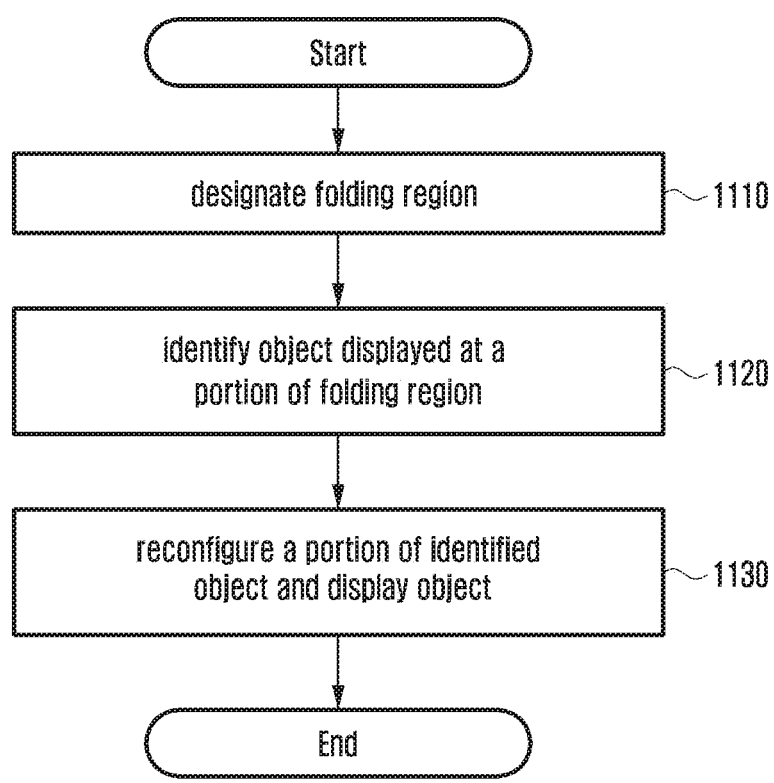
FIG. 11 is a flowchart of a method for the electronic device to reconfigure a portion of an object in the display area excluding the folding region according to an embodiment of the disclosure.

FIG. 11 is a flowchart of a method for the electronic device to reconfigure a portion of an object in the display area excluding the folding region according to an embodiment of the disclosure.

Referring to FIG. 11, at operation 1110, the electronic device 101 may sense the folding of the display. Upon sensing the folding of the display caused by an applied external force, the electronic device 101 may designate a corresponding folding region. For example, the folding region may refer to a region of the display where it is difficult for the user to physically contact because the degree of folding of the display is severe. Or, the folding region may be a region where touch recognition at a position intended by the user is substantially impossible or not smooth even if physical contact is possible. Here, the term "folding region" may be used interchangeably with the term "bending region" as described above with reference to FIG. 3.

At operation 1120, the electronic device 101 may identify an object displayed at at least a portion of the designated folding region. For example, the object may be an interface element that can receive user input (e.g., keyboard, gallery, memo, or video player).

At operation 1130, the electronic device 101 may reconfigure a portion of the identified object for display.

Figure 12:
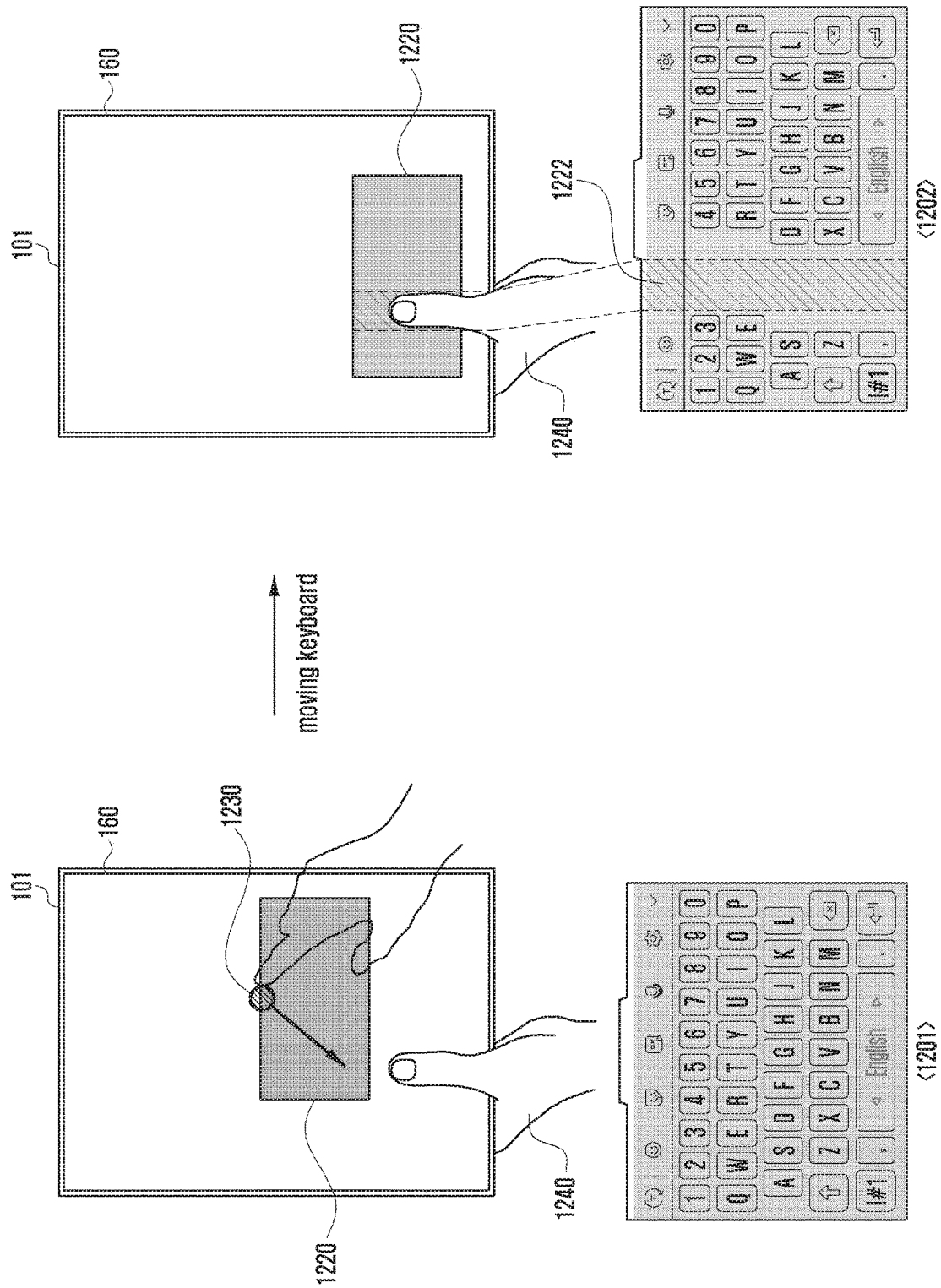
FIG. 12 depicts a process of reconfiguring a portion of an object when the object is moved to the gripping region by a user input according to an embodiment of the disclosure.

FIG. 12 depicts a process of reconfiguring a portion of an object when the object is moved to the gripping region by a user input according to an embodiment of the disclosure.

Referring to FIG. 12, the electronic device 101 may include a display unit 160. For example, the display of the display unit 160 may be bended or folded by a physical force or pressure.

An object 1220 may be displayed on the display of the electronic device 101. For example, the object 1220 may be an input interface element (e.g., soft input panel such as a keyboard or a keypad).

The user of the electronic device 101 may grip a portion of the electronic device 101 with the left hand 1240. A gripping region can be created that is in contact with the left hand 1240 due to the user's grip, and the electronic device 101 can handle the gripping region in a manner similar to the physically deformed region described above. For example, because the gripping region is already being touched by the user's finger, the user cannot immediately identify which object is located on the gripping region (e.g., what type of menu can be selected, or which keypad is located).

As indicated by indicia 1201, the user of the electronic device 101 may apply a movement input 1230 to the object 1220. For example, the user may enter a movement input 1230 to move the object 1220 to the gripping region.

As indicated by indicia 1202, the electronic device 101 may set a shaded portion 1222 according to the gripping region and the object 1220 located on the gripping region. Then, the electronic device 101 can reconfigure the object 1220 located on the gripping region for display. If the object 1220 includes a plurality of input keys that can be touched by the user (e.g., letters, images, or emoticons), the electronic device 101 may change the arrangement of one or more input keys located in the gripping region among the plural input keys. For example, the electronic device 101 may stretch the object 1220 to the left and right and configure the object 1220 to include the shaded portion 1222. In addition, the plural input keys may be distributed in the remaining area of the object except for the shaded portion 1222. Consequently, as the input keys to be touched are no longer arranged in the gripping region, the user of the electronic device 101 can enter a desired key or button more easily.

Unlike the case indicated by indicia 1202, if the user's movement input 1230 overlaps or is proximate to at least a portion of the gripping region, the electronic device 101 may ignore the movement input 1230 of the user. For example, the electronic device 101 may notify the user that the movement of the object 1220 to the gripping region is not possible by using a vibration, sound, animation effect, or the like. The electronic device 101 may return the object 1220 to the location where the object 1220 was located prior to the movement input 1230 and display the object 1220 at the original location.

FIG. 12 illustrates a case where an object is moved to the gripping region by a user input. However, the disclosure is not limited thereto. The same may apply to the case where the electronic device 101 moves a displayed object to the remaining display area except for the folding region in response to folding or bending of the electronic device 101.

Figure 13:
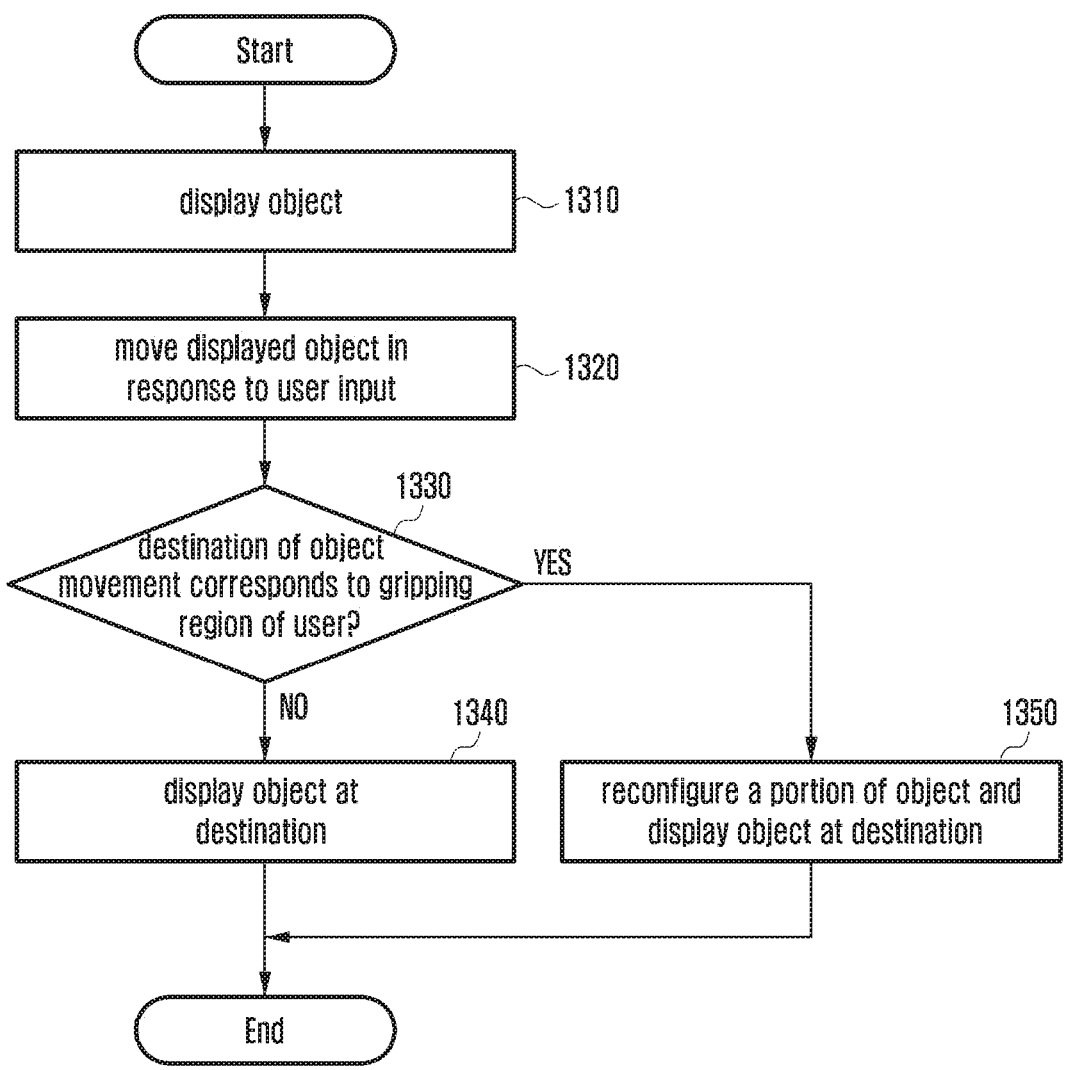
FIG. 13 is a flowchart of a method for reconfiguring a portion of an object in the target region when the object is moved to the gripping region by a user input according to an embodiment of the disclosure.

FIG. 13 is a flowchart of a method for reconfiguring a portion of an object in the target region when the object is moved to the gripping region by a user input according to an embodiment of the disclosure.

Referring to FIG. 13, at operation 1310, the electronic device 101 may display an object on the display.

At operation 1320, the electronic device 101 may move the displayed object in response to a user input.

At operation 1330, the electronic device 101 may check whether the destination to which the object is to be moved corresponds to the gripping region of the user.

If the destination to which the object is to be moved does not correspond to the gripping region of the user, then at operation 1340, the electronic device 101 may display the object at the destination to which the object is to be moved.

If the destination to which the object is to be moved corresponds to the gripping region of the user, then at operation 1350, the electronic device 101 may reconfigure a portion of the object and display the reconfigured object at the destination.

The flowchart of FIG. 13 describes a case where an object is moved to the gripping region by a user input. However, the disclosure is not limited thereto. The same may apply to the case where the electronic device 101 moves a displayed object to the remaining display area except for the folding region in response to folding or bending of the electronic device 101.

Figure 14:
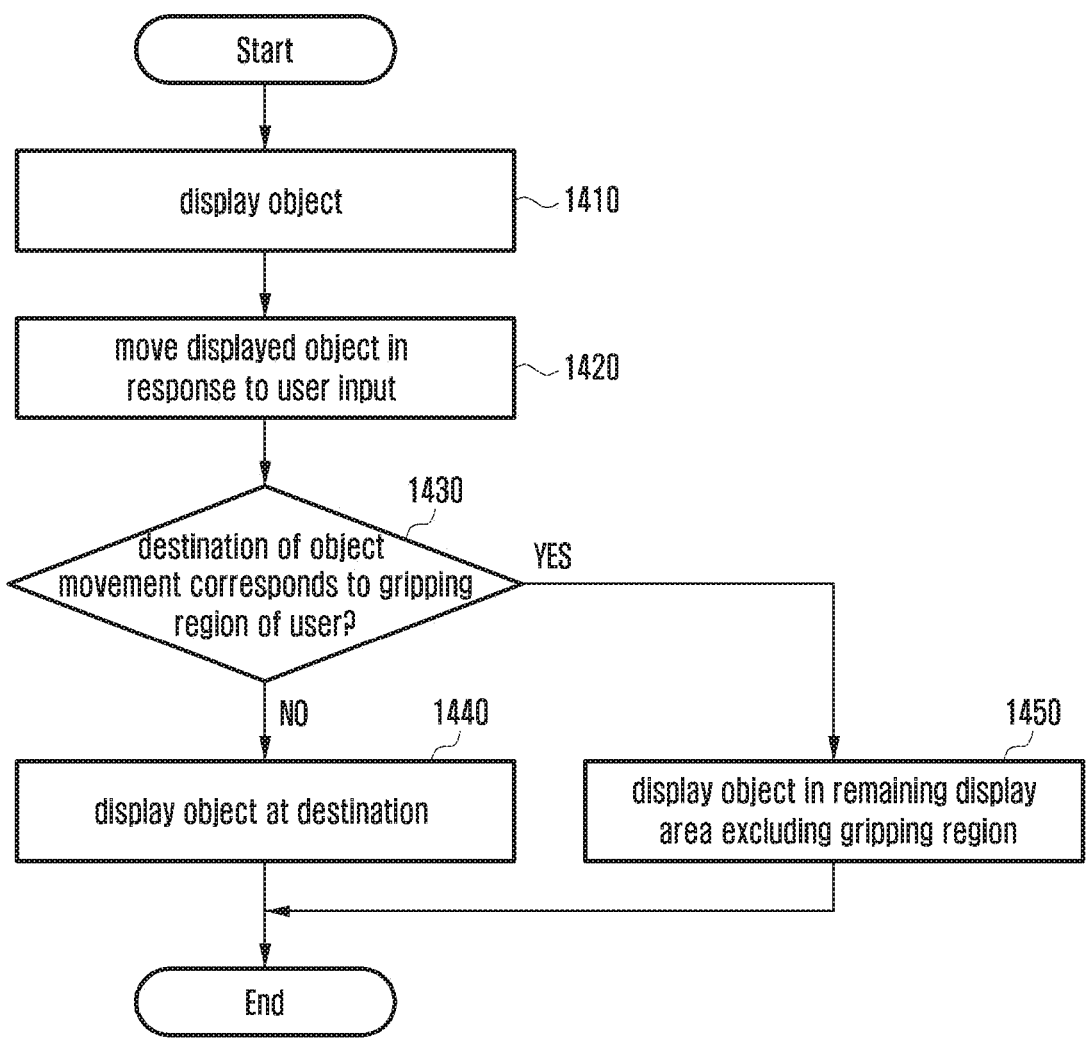
FIG. 14 is a flowchart of a method for displaying an object in the remaining display area other than the gripping region when the object is moved to the gripping region by a user input according to an embodiment of the disclosure.

FIG. 14 is a flowchart of a method for displaying an object in the remaining display area other than the gripping region when the object is moved to the gripping region by a user input according to an embodiment of the disclosure.

Referring to FIG. 14, at operation 1410, the electronic device 101 may display an object on the display.

At operation 1420, the electronic device 101 may move the displayed object in response to a user input.

At operation 1430, the electronic device 101 may check whether the destination to which the object is to be moved corresponds to the gripping region of the user.

If the destination to which the object is to be moved does not correspond to the gripping region of the user, at operation 1440, the electronic device 101 may display the object at the destination to which the object is to be moved.

If the destination to which the object is to be moved corresponds to the gripping region of the user, at operation 1450, the electronic device 101 may display the object in the remaining display area other than the gripping region.

The flowchart of FIG. 14 describes a case where an object is moved to the gripping region by a user input. However, the disclosure is not limited thereto. The same may apply to the case where the electronic device 101 moves a displayed object to the remaining display area except for the folding region in response to folding or bending of the electronic device 101.

According to various embodiments of the disclosure, the electronic device may include a foldable housing configured to include a first housing member having a first surface and a second surface facing away from the first surface, a second housing member having a first surface facing the first surface of the first housing member when folded in a first direction and a second surface facing the second surface of the first housing member when folded in a second direction, and a connection mechanism connecting the first housing member and the second housing member; a flexible display exposed through the first surface of the first housing member and the first surface of the second housing member; a processor electrically connected to the flexible display; and a memory electrically connected to the processor, wherein the memory may store instructions that, when executed, cause the processor to designate a physically deformed specific region of the flexible display, determine whether at least one selectable object is located in the specific region, and reconfigure the at least one selectable object.

The specific region may be generated when the flexible display is folded or bent by an external force.

The specific region may include a space separated by a preset distance from a folding line or a bending line generated when the flexible display is folded or bent by an external force.

The memory may store instructions that, when executed, cause the processor to designate the specific region when the angle between a first display area of the flexible display exposed through the first surface of the first housing member and a second display area of the flexible display exposed through the first surface of the second housing member becomes less than a preset angle.

The memory may store instructions that, when executed, cause the processor to adjust the size of the specific region according to a change in the angle between the first display area and the second display area of the flexible display.

The memory may store at least one of instructions that, when executed, cause the processor to increase the size of the specific region when the angle between the first display area and the second display area of the flexible display decreases, or instructions that, when executed, cause the processor to decrease the size of the specific region when the angle between the first display area and the second display area of the flexible display increases from below the preset angle.

The memory may store instructions that, when executed, cause the processor to move, if at least one selectable object is located in the specific region, the at least one selectable object to display the same in the remaining display area of the flexible display except for the specific region.

The memory may store at least one of instructions that, when executed, cause the processor to display, when the first housing member is folded toward the second housing member with respect to the connection mechanism by an external force while at least one selectable object is located in the specific region, the at least one selectable object in the second display area of the flexible display excluding the specific region, or instructions that, when executed, cause the processor to display, when the second housing member is folded toward the first housing member with respect to the connection mechanism by an external force while at least one selectable object is located in the specific region, the at least one selectable object in the first display area of the flexible display excluding the specific region.

The memory may store at least one of instructions that, when executed, cause the processor to display, while at least one selectable object is located in the specific region, if the area of the first display area occupied by the at least one selectable object is greater than the area of the second display area occupied by the at least one selectable object, the at least one selectable object in the first display area of the flexible display excluding the specific region, or instructions that, when executed, cause the processor to display, if the area of the first display area occupied by the at least one selectable object is less than the area of the second display area occupied by the at least one selectable object, the at least one selectable object in the second display area of the flexible display excluding the specific region.

The memory may store instructions that, when executed, cause the processor to change, if at least one selectable object is located in the specific region, at least one of the size or the layout of the at least one selectable object for display.

The two displays of the electronic device may be connected through a connection mechanism such as a hinge.

However, it is not necessarily limited to the above example. Various embodiments of object display can be implemented using a flexible display constituting a single display. Hence, the location where a physical deformation occurs in the electronic device may not necessarily be the central portion of the display, and the physical deformation may occur at various locations of the electronic device.

According to various embodiments of the disclosure, the electronic device may include a foldable display; a processor electrically connected to the foldable display; and a memory electrically connected to the processor, wherein the memory may store instructions that, when executed, cause the processor to: designate a physically deformed specific region of the foldable display; determine whether at least one selectable object is located in the specific region; and reconfigure the at least one selectable object.

The specific region may be generated when the foldable display is folded or bent by an external force.

The specific region may include a space separated by a preset distance from a folding line or a bending line generated when the foldable display is folded or bent by an external force.

The memory may store instructions that, when executed, cause the processor to designate the specific region when the folded or bent angle of the foldable display is less than a preset angle with respect to the folding line or the bending line.

The memory may store instructions that, when executed, cause the processor to adjust the size of the specific region with the folding line or the bending line as a central axis according to the folded or bent angle of the foldable display.

The memory may store at least one of instructions that, when executed, cause the processor to increase the size of the specific region when the folded or bent angle of the foldable display decreases, or instructions that, when executed, cause the processor to decrease the size of the specific region when the folded or bent angle of the foldable display increases from below the preset angle.

The memory may store instructions that, when executed, cause the processor to move, if at least one selectable object is located in the specific region, the at least one selectable object to display the same in the remaining display area except for the specific region.

The memory may store instructions that, when executed, cause the processor to move, if at least one selectable object is located in the specific region, the at least one selectable object based on the folding direction of the foldable display to display the same in the remaining display area except for the specific region.

The memory may store instructions that, when executed, cause the processor to move, if at least one selectable object is located in the specific region, the at least one selectable object to display the same in the remaining display area except for the specific region, and wherein the remaining display area may be a larger area overlapping the at least one selectable object with respect to the folding line or the bending line.

The memory may store instructions that, when executed, cause the processor to change, if at least one selectable object is located in the specific region, at least one of the size or the layout of the at least one selectable object for display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a foldable housing including:
a first housing member having a first surface and a second surface facing away from the first surface,
a second housing member having a first surface facing the first surface of the first housing member when folded in a first direction and a second surface facing the second surface of the first housing member when folded in a second direction, and
a connection mechanism connecting the first housing member and the second housing member;
a flexible display exposed through the first surface of the first housing member and the first surface of the second housing member;
a processor electrically connected to the flexible display; and
a memory electrically connected to the processor,
wherein the memory stores instructions that, when executed, cause the processor to:
designate a specific region of the flexible display, the specific region being physically deformed,
determine whether an object including at least one selectable object is located in the specific region, and
reconfigure the at least one selectable object by expanding an area on which the object is displayed to include a shaded portion and distributing the at least one selectable object in a remaining portion of the expanded area, the shaded portion being displayed on the specific region.

2. The electronic device of claim 1, wherein the specific region is generated when the flexible display is folded or bent by an external force.

3. The electronic device of claim 1, wherein the specific region includes a space separated by a preset distance from a folding line or a bending line generated when the flexible display is folded or bent by an external force.

4. The electronic device of claim 1, wherein the memory stores instructions that, when executed, further cause the processor to designate the specific region when the angle between a first display area of the flexible display exposed through the first surface of the first housing member and a second display area of the flexible display exposed through the first surface of the second housing member becomes less than a preset angle.

5. The electronic device of claim 4, wherein the memory stores instructions that, when executed, further cause the processor to adjust a size of the specific region according to a change in the angle between the first display area and the second display area of the flexible display.

6. The electronic device of claim 5, wherein the memory stores at least one of:
instructions that, when executed, further cause the processor to increase the size of the specific region when the angle between the first display area and the second display area of the flexible display decreases, or
instructions that, when executed, further cause the processor to decrease the size of the specific region when the angle between the first display area and the second display area of the flexible display increases from below the preset angle.

7. The electronic device of claim 4, wherein the memory stores at least one of:
instructions that, when executed, further cause the processor to display, when the first housing member is folded toward the second housing member with respect to the connection mechanism by an external force while the at least one selectable object is located in the specific region, the at least one selectable object in the second display area of the flexible display excluding the specific region, or instructions that, when executed, further cause the processor to display, when the second housing member is folded toward the first housing member with respect to the connection mechanism by an external force while the at least one selectable object is located in the specific region, the at least one selectable object in the first display area of the flexible display excluding the specific region.

8. The electronic device of claim 4, wherein the memory stores at least one of:

instructions that, when executed, further cause the processor to display, while the at least one selectable object is located in the specific region, if the area of the first display area occupied by the at least one selectable object is greater than the area of the second display area occupied by the at least one selectable object, the at least one selectable object in the first display area of the flexible display excluding the specific region, or instructions that, when executed, further cause the processor to display, if the area of the first display area occupied by the at least one selectable object is less than the area of the second display area occupied by the at least one selectable object, the at least one selectable object in the second display area of the flexible display excluding the specific region.

9. The electronic device of claim 1, wherein the memory stores instructions that, when executed, further cause the processor to move, if the at least one selectable object is located in the specific region, the at least one selectable object to display the at least one selectable object in the remaining display area of the flexible display except for the specific region.

10. The electronic device of claim 1, wherein the memory stores instructions that, when executed, further cause the processor to change, if the at least one selectable object is located in the specific region, at least one of a size or a layout of the at least one selectable object for display.

11. An electronic device comprising:
a foldable display;
a processor electrically connected to the foldable display; and
a memory electrically connected to the processor,
wherein the memory stores instructions that, when executed, cause the processor to:
designate a specific region of the foldable display, the specific region being physically deformed,
determine whether an object including at least one selectable object is located in the specific region, and
reconfigure the at least one selectable object by expanding an area on which the object is displayed to include a shaded portion and distributing the at least one selectable object in a remaining portion of the expanded area, the shaded portion being displayed on the specific region.

12. The electronic device of claim 11, wherein the specific region is generated when the foldable display is folded or bent by an external force.

13. The electronic device of claim 11, wherein the specific region includes a space separated by a preset distance from a folding line or a bending line generated when the foldable display is folded or bent by an external force.

14. The electronic device of claim 13, wherein the memory stores instructions that, when executed, further cause the processor to designate the specific region when a folded or bent angle of the foldable display is less than a preset angle with respect to the folding line or the bending line.

15. The electronic device of claim 13, wherein the memory stores instructions that, when executed, further cause the processor to adjust a size of the specific region with the folding line or the bending line as a central axis according to a folded or bent angle of the foldable display.

16. The electronic device of claim 13, wherein the memory stores at least one of:

instructions that, when executed, further cause the processor to increase a size of the specific region when a folded or bent angle of the foldable display decreases, or instructions that, when executed, further cause the processor to decrease the size of the specific region when the folded or bent angle of the foldable display increases from below a preset angle.

17. The electronic device of claim 13, wherein the memory stores instructions that, when executed, further cause the processor to move, if the at least one selectable object is located in the specific region, the at least one selectable object to display the at least one selectable object in the remaining display area except for the specific region.

18. The electronic device of claim 17, wherein the memory stores instructions that, when executed, further cause the processor to move, if the at least one selectable object is located in the specific region, the at least one selectable object based on the folding direction of the foldable display to display the at least one selectable object in the remaining display area except for the specific region.

19. The electronic device of claim 17,
wherein the memory stores instructions that, when executed, cause the processor to move, if the at least one selectable object is located in the specific region, the at least one selectable object to display the at least one selectable object in the remaining display area except for the specific region, and
wherein the remaining display area is a larger area overlapping the at least one selectable object with respect to the folding line or the bending line.

20. The electronic device of claim 11, wherein the memory stores instructions that, when executed, further cause the processor to change, if the at least one selectable object is located in the specific region, at least one of a size or a layout of the at least one selectable object for display.

* * * * *